E. J. BRADY.
SIGN.
APPLICATION FILED JUNE 13, 1914.
1,171,397.
Patented Feb. 8, 1916.
2 SHEETS—SHEET 1.
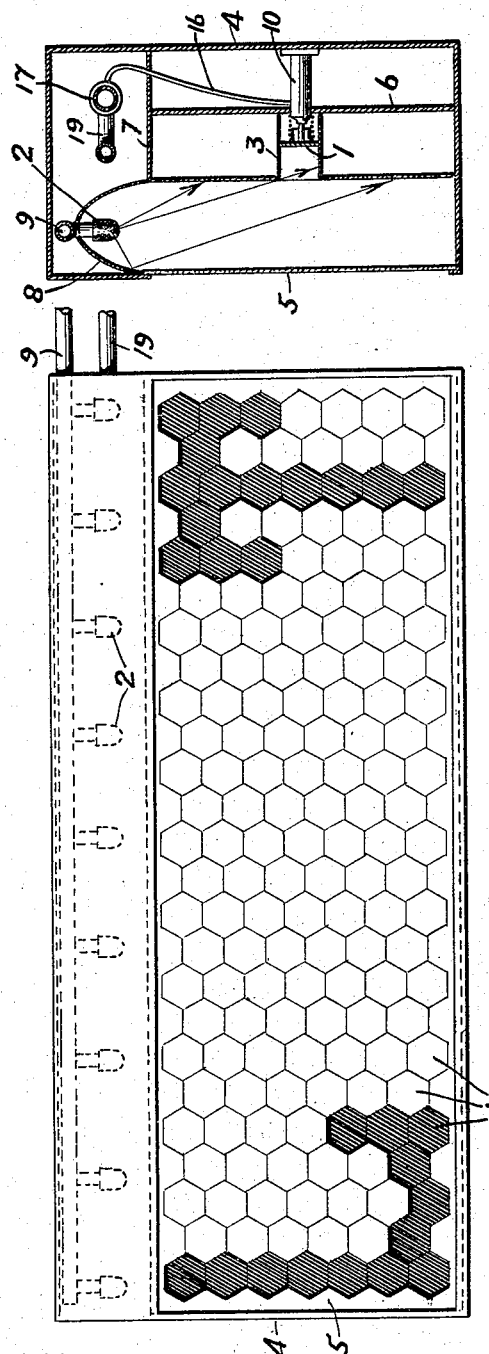
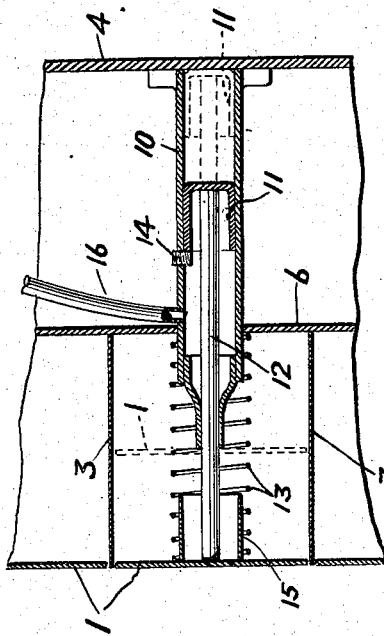
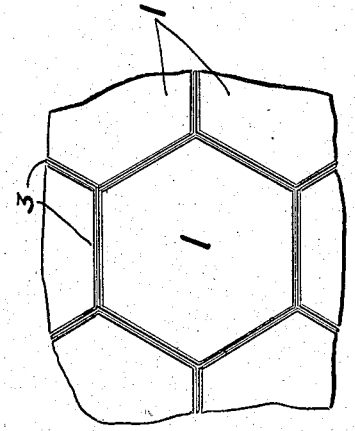
WITNESSES:
INVENTOR
Edward J. Brady
BY
ATTORNEY.

E. J. BRADY.
SIGN.
APPLICATION FILED JUNE 13, 1914.
1,171,397.
Patented Feb. 8, 1916.
2 SHEETS—SHEET 2.
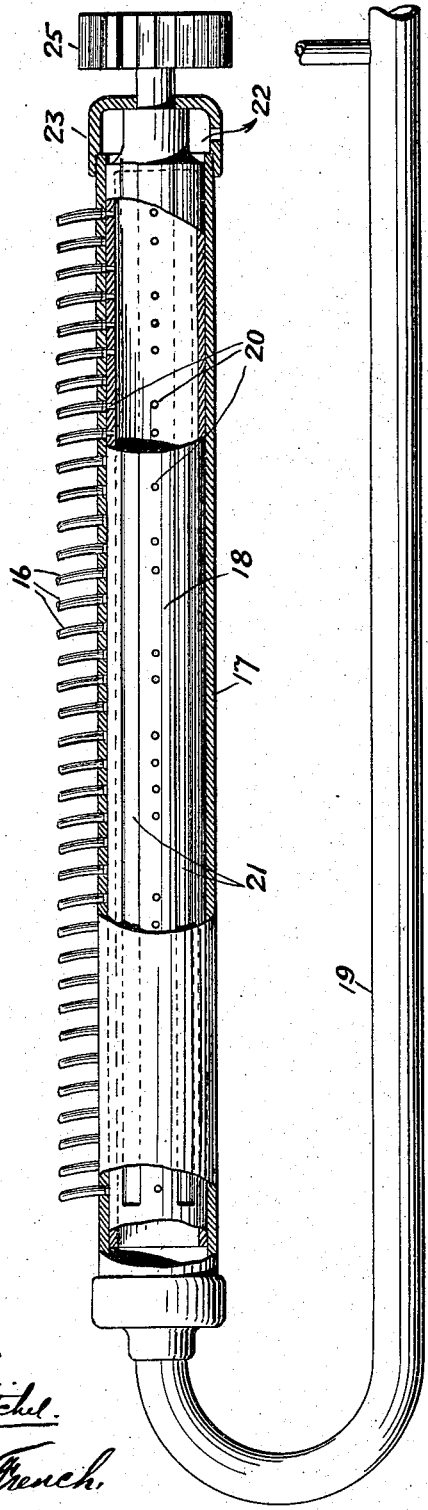
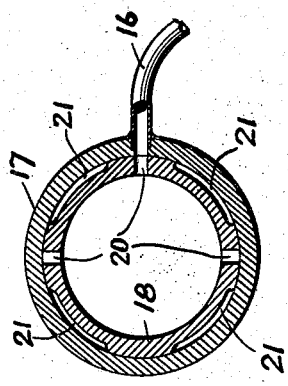
WITNESSES:
INVENTOR
Edward J. Brady
BY
ATTORNEY.

UNITED STATES PATENT OFFICE.

EDWARD J. BRADY, OF PHILADELPHIA, PENNSYLVANIA, ASSIGNOR TO THE UNITED GAS IMPROVEMENT COMPANY, OF PHILADELPHIA, PENNSYLVANIA, A CORPORATION OF PENNSYLVANIA.

SIGN.

1,171,397.   Specification of Letters Patent.   Patented Feb. 8, 1916.

Application filed June 13, 1914. Serial No. 844,869.

*To all whom it may concern:*

Be it known that I, EDWARD J. BRADY, a citizen of the United States, and a resident of Philadelphia, in the county of Philadelphia and State of Pennsylvania, have invented certain new and useful Improvements in Signs, of which the following is a specification.

The principal object of the present invention is to provide an illuminated talking or changing display sign which is economical in construction and operation, in that it requires but few lights and is easy on the eyes and legible, since it shows sharp dark letters or a wide variety of sharp display on a light ground. It employs constantly burning lights and is well suited to gas illumination and the display may be easily changed.

The invention will be claimed at the end hereof, but will be first described in connection with the accompanying drawings, forming part hereof, and in which—

Figure 1, is a front view of a sign embodying features of the invention. Fig. 2, is a transverse sectional view of the same, showing but one of the cells. Fig. 3, is a front view of a portion of the surface of the sign, drawn to an enlarged scale, and showing one of the elements. Fig. 4, is a transverse sectional view of Fig. 3. Fig. 5, is a side view, partly in section and partly in elevation, illustrating parts of the sign, and Fig. 6, is a sectional view, drawn to an enlarged scale, of a part of the apparatus shown at the top in Fig. 5.

The elements 1 form the sign surface.

2, is a source of light, of which the illumination falls obliquely upon the sign surface.

3, are cells in respect to which the elements 1 are movable to change the amount of light falling upon different parts of the surface to form the display.

4, is a housing, within which the parts of the sign may be arranged, and it is provided with a transparent front 5.

6, is a back plate and 7 a partition which carries the reflector 8, that serves to throw light obliquely upon the surface of the sign. The source of light is shown as a row of inverted incandescent gas lights supplied from a pipe 9. Of course any other source of light may be employed, but the invention is particularly well adapted for use in connection with gas, because the source of light burns constantly. Toward the front, the back plate is provided with projecting walls or partitions that make up the cells 3 and these walls or partitions may be black. In the space at the back of the back plate are arranged cylinders 10 which are provided with pistons 11 connected with the stems 12 of the elements 1. The elements may present a mat-white surface and they are normally in one plane, constituting the surface of the sign. Springs 13 and some kind of stops, as 14, serve to normally position the elements 1 in the same plane. The cylinder 15 serves to accommodate the spring 13.

In Fig. 4, the dotted lines show the position of the element 1 when it is retracted into its cell and hence not illuminated. Each cylinder 10 is connected by a short tube 16 with the casing 17 of a rotary valve. The casing 17 may be mounted above the partition 7 and kept properly warm by heat from the source of light 2. The tubes 16 are alined along the casing 17. Within the casing there is a rotary hollow valve 18. Compressed air is admitted to the interior of this valve 18, as by a pipe 19. The valve 18 is provided with rows of ports 20 which are disposed in appropriate angular relation. On the outside of the rotary valve and between the rows of ports are exhaust channels 21 which communicate with an offtake 22. 23 is a removable cap by means of which the rotary valve can be withdrawn and replaced by another rotary valve.

In use the display, whether letters or numbers or figures or what-not, is produced by withdrawing those elements 1 into their cells 3 which are appropriate for producing the desired display. The light shining obliquely on the sign surface illuminates that surface but does not illuminate the elements which are retracted into their cells, hence the display is dark or black upon a light or white ground. The elements may, of course, be moved by a great variety of mechanism, but having reference to the accompanying drawings, the combinations in which they are moved and the means by which they are moved are as follows: The rotary valve is intermittently turned, for example, by power applied to the ratchet wheel 25, which is connected with it. The rows of holes or ports 20 in the rotary valve correspond to those elements 1, which it is desired to retract in order to make the required display. By the movement of the valve 18 a row of holes or ports is brought opposite the row of tubes 16. Compressed air passes through the ports 20 and to the tube 16, thus actuating the pistons in the cylinders with which the tubes 16 connect and so withdrawing a group of elements 1 into their cells. At the next turning movement of the rotary valve 18, the tubes 16 and their cylinders 10 are brought into communication with the exhaust channel 21 and so the pistons 10 are exhausted through the opening 22. The springs 13 then return the elements to the sign surface, thereafter the valve 18 is again rotated and stopped and the operation is repeated with another combination of elements producing a different display.

It will be obvious to those skilled in the art that modifications may be made in details of construction and arrangement without departing from the spirit of the invention, which is not intended to be limited further than the prior state of the art or the appended claim may require.

What I claim is:—

A sign comprising the combination of cells having walls, elements movable within the cells and normally forming the sign surface, illuminating means from which light falls obliquely upon the sign surface, and means for withdrawing the elements into the cells to permit the walls thereof to totally obscure the light in all directions from the faces of the elements, substantially as described.

In testimony whereof I have hereunto signed my name.

EDWARD J. BRADY.

Witnesses:
S. E. PATTERSON,
FRANK E. FRENCH.

Copies of this patent may be obtained for five cents each, by addressing the "Commissioner of Patents, Washington, D. C."